(12) United States Patent
Calvez et al.

(10) Patent No.: US 6,981,145 B1
(45) Date of Patent: Dec. 27, 2005

(54) DEVICE AND PROCESS FOR REMOTE AUTHENTICATION OF A USER

(75) Inventors: Pierre Calvez, Rueil Malmaison (FR); Florent Picinbono, Marly le Roi (FR); Max Vallot, Viroflay (FR); Brigitte Courtaux, Rueil Malmaison (FR); Thierry Rondeau, Paris (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/499,736

(22) Filed: Feb. 8, 2000

(30) Foreign Application Priority Data

Feb. 8, 1999 (FR) .................................. 99 01449

(51) Int. Cl.[7] .......................... H04L 9/00; H04L 9/32; H04K 1/00; G06F 11/30; G06F 12/14

(52) U.S. Cl. .................... 713/170; 713/183; 713/202; 709/225; 709/229

(58) Field of Search ............................... 713/156, 169, 713/170, 171, 191, 182, 183, 202; 380/281, 380/282, 284, 30; 709/219, 203, 225, 229, 709/230

(56) References Cited

U.S. PATENT DOCUMENTS

| | | | |
|---|---|---|---|
| 5,081,677 A * | 1/1992 | Green et al. ................. | 380/281 |
| 5,491,752 A * | 2/1996 | Kaufman et al. ............. | 380/30 |
| 5,668,876 A | 9/1997 | Falk et al. | |
| 5,774,650 A * | 6/1998 | Chapman et al. ........... | 713/200 |
| 5,778,065 A * | 7/1998 | Hauser et al. ............... | 713/155 |
| 5,841,871 A * | 11/1998 | Pinkas ......................... | 713/155 |
| 6,014,085 A * | 1/2000 | Patel ........................... | 455/410 |
| 6,161,185 A * | 12/2000 | Guthrie et al. .............. | 713/201 |
| 6,263,369 B1 * | 7/2001 | Sitaraman et al. .......... | 709/225 |
| 6,401,204 B1 * | 6/2002 | Euchner et al. ............. | 713/169 |

FOREIGN PATENT DOCUMENTS

| | | |
|---|---|---|
| EP | 0 444 351 A | 9/1991 |
| JP | 0 511 732 A | 11/1992 |

OTHER PUBLICATIONS

Meggitt, Ashley J. and Timothy D. Ritchey. Windows NT User Administration. 1997, O'Reilly & Associates, pp. 139-142.*

Schneier, Bruce. Applied Cryptography, Second Edition. 1996, John Wiley & Sons, Inc., pp 52-56.*

Lin, Hung-Yu et al. "Authentication Protocols for Personal Communication Systems", 1995 ACM.*

* cited by examiner

*Primary Examiner*—Gilberto Barrón, Jr.
*Assistant Examiner*—Michael J. Simitoski
(74) *Attorney, Agent, or Firm*—Miles & Stockbridge P.C.; Edward J. Kondracki (57) ABSTRACT

The present invention relates to a process for remote authentication of a user (7) for local access to a local machine (4) of a network (5) having a server (3) managed by an administrator (8). The local machine (4) creates a challenge (D) which is communicated to the administrator (8), together with elements known by the user via communication means (9) independent from the network (5). A predetermined calculation is performed by means of the server (3) in order to obtain a first response (RD) to the challenge (D). The response (RD) is first transmitted to the user (7) obtained through the communication means (9). A calculation is performed by means of the local machine (4) in the same way as the server (3) in order to obtain a second response (RD1) to the challenge (D). The first and second responses (RD) and (RD1) and the local connection are authorized based on the result.

21 Claims, 3 Drawing Sheets

FIG.1

```
Please notify your Administrator of the challenge
by telephone, then enter your Name, Password,
    and the Response from your Administrator.
```

| Name | DUPONT | | OK |
|---|---|---|---|
| Password | *** | | Cancel |
| Challenge | | | |
| Response | | | |
| Mode | Maintenance ▽ | | |

FIG.2

Maintenance

| User Name | |
|---|---|
| Local Machine Name | |
| Challenge | |
| Response | |

| Apply | Restore | Cancel | Help |

FIG.3

**Connection in MAINTENANCE mode
Enter a Name and a Password**

Name [ ]          [ OK ]

Password [ ]     [ Cancel ]

FIG.4

Do you want to terminate the MAINTENANCE Mode?

[ Yes ]          [ No ]

FIG.5

**Enter a Name and a Password
that are valid in this system.**

Name [ ]          [ OK ]

Password [ ]     [ Cancel ]

Mode [ Maintenance ▽ ]

FIG.6

DEVICE AND PROCESS FOR REMOTE AUTHENTICATION OF A USER

FIELD OF THE INVENTION

The present invention relates to the field of secure remote authentication systems for controlling a user's local access to a station.

DESCRIPTION OF THE RELATED ART

In a distributed environment, there are known secure access control systems that provide secure remote control through a network of users' access to protected resources.

Within the framework of the present invention, the term "resource" should be understood in its broadest sense. It includes, among other things, software applications, databases or files, specific fields of these files, complete systems, machines, specific devices such as peripherals, etc.

Secure access control systems guarantee the identification of users in order to determine whether they are among the persons authorized to use the resources in question. A secure access control system generally includes a centralized database in which information about the users, their means of authentication, the operations authorized, etc., are stored. The means of authentication can consist in, for example, a password, a chip card, a single-use password, etc.

An administrator manages the central database homogeneously throughout the information system. Each user is authenticated by a central authentication server having access to the central database.

Secure remote access control systems pose a problem when one of the elements involved in the authentication is no longer working. Thus, for example, in case of the server's unavailability or failure, in case of a failure at the network level, in case of a software or hardware problem that prevents access to the network, in case of a problem in the authentication software itself or in its configuration, or in other equivalent cases, it becomes impossible for anyone, most particularly those in charge of maintenance, to be authenticated and hence to connect, even locally. The operator in charge of maintenance is forced to wipe out the information system, for example, by completely reinstalling it.

There is a known solution that consists of using a local security cache generated during the first authentication of the user. The local cache contains all the elements that make it possible to authenticate the user locally. The cache is subsequently re-usable by the user in question. This solution has the drawback, for the operators in charge of maintenance, of having to be authenticated a first time in all of the stations in which they are capable of intervening, in order to create a cache dedicated to themselves in each of said stations. Moreover, if any failure occurs before a user has had the time to connect to his station, said user cannot connect without the local security cache.

SUMMARY OF THE INVENTION

An object of the present invention is to authenticate a user locally in a station while avoiding a remote authentication performed by a server through a network, the server centralizing all of the data involved in access authorizations such as user names, passwords, etc.

An object of the present invention is to make it possible to connect to a station locally when the authentication server, the network, or another component is down or unavailable.

In this context, the present invention offers a process for the remote authentication of a user for local access to a local machine belonging to a network, the network including a remote server managed by an administrator, the server containing means for classifying information, characterized in that it consists of:

creating a challenge D capable of being transmitted by communication means, the communication means connecting the user with the administrator;

communicating to the administrator the challenge D created, as well as elements known by the user, via the communication means;

performing a predetermined calculation by means of the server in order to obtain a response RD that is a function of the challenge D and/or of predetermined data;

transmitting to the user the response RD obtained through the communication means;

performing a calculation by means of the local machine in the same way as the server in order to obtain a response RD1 that is a function of the challenge D and/or of predetermined data;

comparing the response RD transmitted by the administrator and the response RD1 calculated by the local machine and locally authorizing the user's connection to the machine based on the result of the comparison.

The present invention also offers a system for the remote authentication of a user for local access to a machine called a local machine, belonging to a network that includes a remote server managed by an administrator, the server containing means for classifying information, characterized in that it comprises communication means connecting the user with the administrator, in that each local machine comprises a user authentication module comprising a user module for generating a challenge, and a user module for calculating a response to a challenge, and in that the server comprises an administrative authentication module comprising an administrative module for calculating a response to a challenge.

BRIEF DESCRIPTION OF THE DRAWINGS

Other characteristics and advantages of the invention will become clear in light of the following description, given as an illustrative and non-limiting example of the present invention, in reference to the attached drawings in which.

DESCRIPTION OF THE PREFERRED EMBODIMENT(S)

Throughout the following description, the term "local" defines proximity to a reference point constituted by a user of the system. The term "remote" defines a distance from the reference point or local position.

Figure 1:
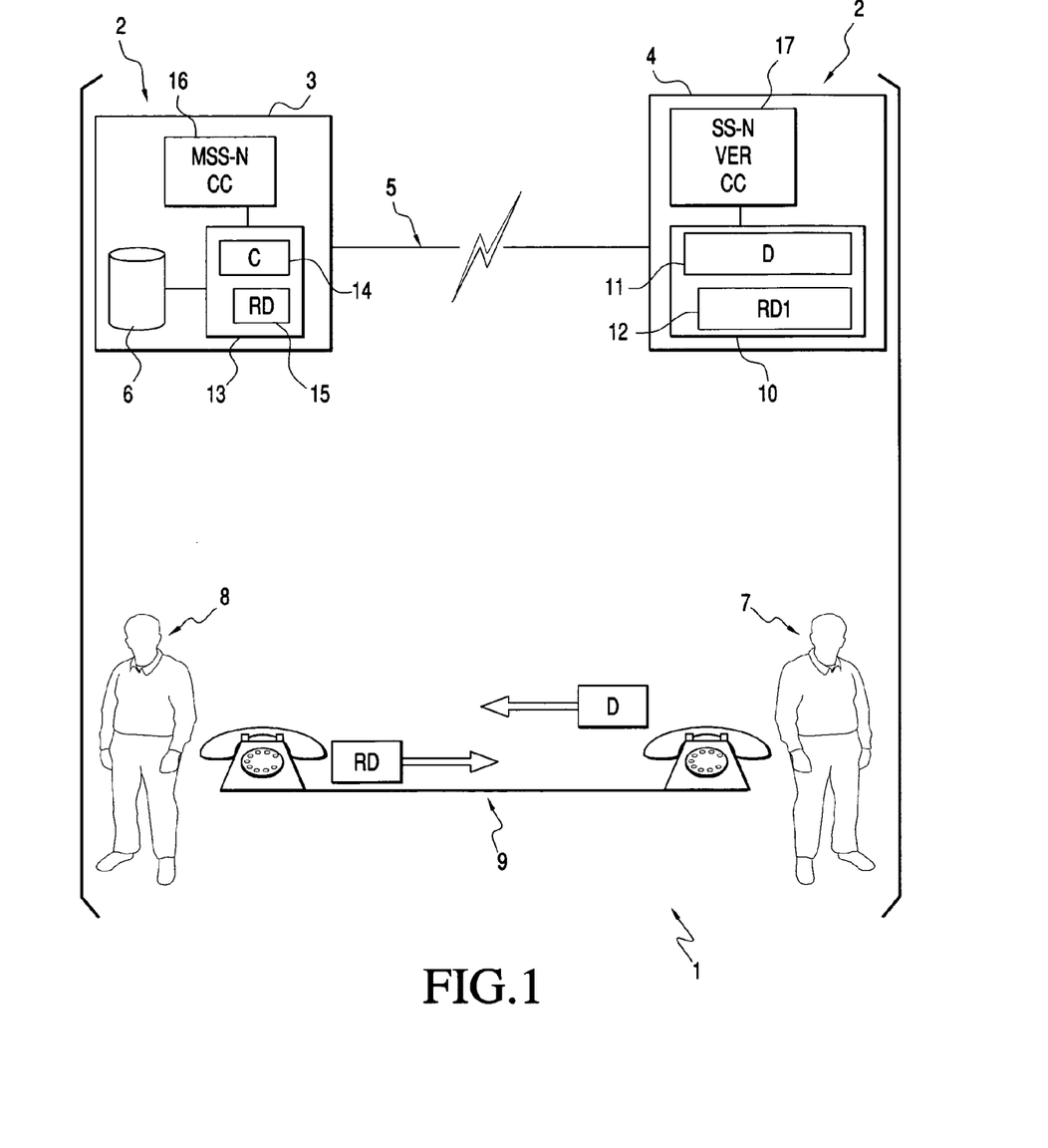
FIG. 1 is a simplified global diagram of the authentication system according to the present invention.

As represented in FIG. 1, the present invention relates to a computer system 1 comprising at least two machines 2 with their standard essential components, i.e., processor, central processing unit, input/output, etc. One of the outputs of the machines 2 is embodied by a screen on which the dialog boxes represented in FIGS. 2 through 6 are displayed. One of the machines 2 plays a specific role in relation to the others and is called a remote server 3, the other machines being called local machines 4.

The remote server 3 is linked to the local machines 4 through a network 5. The server 3 includes a central database 6 in which information on the users 7 of the system 1 is stored. In particular, said information, for each user 7, can consist in a user name and a password. An administrator 8 manages the central database 6.

The system 1 comprises communication means 9 between each user 7 and the administrator 8. According to one embodiment, the communication means 9 link a user 7 directly and/or in a secure manner to an administrator 8. According to a development of the invention that is particularly advantageous when the network 5 is down or unavailable, the communication means 9 work off line, i.e., without connecting to the network. The communication means, as illustrated in FIG. 1, can consist in a telephone line. Any other communication means such as for example a telex, a radio line, or a computer connection can be used.

Software user authentication modules 10 are provided in each local machine 4. They comprise a user module for generating a challenge 11 and a user module for calculating a response to a challenge 12. A software administrative authentication module 13 is provided in the server 3. It comprises an administrative secret modification module 14 and an administrative module for calculating a response to a challenge 15. The relationships between modules can exist in any other form; thus, for example, the administrative secret modification module 14 may not be contained in the administrative authentication module 13.

Graphical interfaces are provided in each of the machines 2 for dialoging with a user or administrator. In particular, they display dialog boxes (represented in FIGS. 2 through 6) on the screens of the machines 2. The dialog boxes are used to enter elements communicated by the user or the administrator as well as to display information intended for them.

The remote server 3 and each local machine 4 also include respective administrative 16 and the user 17 storage means. The information contained in the administrative storage means 16 may be contained in the central database 6. In that case, the administrative storage means 16 are eliminated.

As shown in FIG. 1, the user 7 has a local machine 4 to which he wishes to connect. The user 7 enters into the local machine 4 a user name and a password by means of a specially adapted dialog box, and chooses one of the connection modes that are offered him. In the embodiment described, there are several connection modes offered to the user. The so-called normal mode consists in connecting the user 7 to the remote server 3 through the network 5. The so-called maintenance mode consists in locally connecting the user 7 to the local machine 4 after remote authentication by the administrator 8.

The user 7 chooses the normal mode. The user authentication module 10 communicates the user's access authorization request, user name and password to the administrative authentication module 13 through the network 5. The administrative authentication module 13 verifies the presence in the central database 6 of the user name and the associated password. If the user name or the associated password is not in the database 6, access is denied. If the user name and the associated password are in the database 6, the administrative authentication module 13 transmits its authorization to the user authentication module 10. The connection of the user 7 to the local machine 4 and to the network 5 is established.

The authentication described above in the normal mode is called network authentication.

The administrative storage means 16 contain a secret called a Master Station Secret MSS. The Master Station Secret MSS is for example constituted by a byte string; the Master Station Secret MSS is entered by the administrator 8 or randomly generated by the server 3, for example by the administrative authentication module 13. It is capable of being modified over time. The Master Station Secret is accompanied by a version number N. The version number N is incremented with each modification of the Master Station Secret. The initial value of the version number N is 0. During a first successful connection in the normal mode, the administrative authentication module 13 transmits the Master Station Secret MSS and the associated version number N, contained in the administrative storage means 16, to the local machine 4 in question.

To prevent the Master Station Secret MSS from being used in another local machine 4 simply by being copied from one machine to another, the administrative secret modification module 14 modifies the Master Station Secret MSS using a modification key C that depends on the local machine 4 in question. The secret obtained is called a Station Secret SS. The Station Secret SS obtained, as well as the version number N of the corresponding Master Station Secret MSS are transmitted to the local machine 4 in question and stored in the user storage means 17 of the local machine 4 in question.

The modification key C can correspond, for example, to the concatenation of the Master Station Secret and the name of the local machine 4, followed by the hash of the concatenated string obtained by a one-way hash function such as, for example, the known function MD5 or SHA:

Station Secret=C [Master Station Secret]

Station Secret=[Master Station Secret+name of the local machine in question]$_{hash}$ The name of the local machine 4 is transmitted, as will be seen below, by the user 7.

As shown in FIG. 1, the network 5 is down. The user 7 can no longer connect in the normal mode. The user 7 uses the process according to the invention to connect to the local machine 4 in question.

The remote authentication process according to the invention consists of:

creating a challenge D capable of being transmitted by the communication means 9, the communication means 9 connecting the user with the administrator 8;

communicating to the administrator 8 the challenge D created, as well as elements known by the user, via the communication means 9;

performing a predetermined calculation by means of the server 3 in order to obtain a response RD that is a function of the challenge D and/or of predetermined data;

transmitting to the user 7 the response RD obtained through the communication means 9;

performing a calculation by means of the local machine 4 in the same way as the server 3 in order to obtain a response RD1 that is a function of the challenge D and/or of predetermined data;

comparing the response RD transmitted by the administrator to the response RD 1 calculated by the local machine 4 and locally authorizing the user's connection to the machine 4 based on the result of the comparison.

Figure 2:
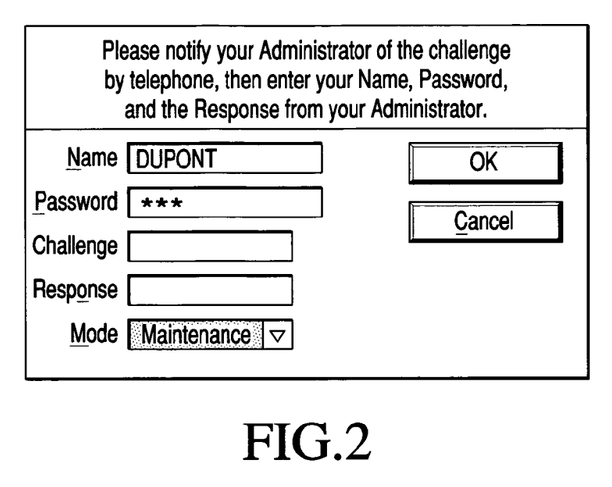
FIGS. 2, 4 through 6 represent the screen of a local machine of the computer system according to an embodiment of the present invention.

The remote authentication process according to the invention consists, first of all, of creating a challenge D capable of being transmitted by the communication means 9. In the embodiment illustrated, the challenge is created by means of the local machine 4. According to one embodiment of the invention, the challenge exists in the form of a byte string, and for example of a character string. The challenge is created by means of the user authentication module 10, and more precisely by means of the user challenge generating module 111 of the local machine 4. To do this, as shown in FIG. 2 which represents the screen of the local machine 4, the user 7 enters into the machine 4 a user name "DUPONT" and a password "* * *" represented by asterisks on the screen. The user name and the password are temporarily stored in the user storage means 17. The user 7 indicates to the local machine 4 that he wishes to be authenticated locally without going through the network authentication by choosing the adapted connection mode. The user 7 chooses the maintenance mode: he fills in the box designated by the word "mode" with the word "maintenance".

The user challenge generating module 11 calculates a challenge D. The challenge D is, according to one exemplary embodiment, a string of twelve alphanumeric characters constituted in the following way:

The first byte represents the type of challenge: it can have two values, L for limited and S for standard, each corresponding to a type of challenge. The standard challenge is used in the case where the local machine 4 in question has connected to the server 3 at least once, the limited challenge being used if this is not the case. The response to the first, so-called standard type of challenge is calculated as a function of the Station Secret SS transmitted by the remote server 3 to the local machine 4 in question during the first connection of the machine 4 to the server 3 through the network 5. The response to the challenge is a function of the Station Secret SS shared between the server 3 and the local machine 4 in question. If there has been no such first network authentication, there is a second, so-called limited type of challenge that does not involve the Station Secret. The response to the second type of challenge is a function of a fixed security key CC known by the machine 4 in question and by the server 3;

The second and third bytes represent the version number N of the Master Station Secret contained in the user storage means 17;

The fourth through twelfth bytes are random alphanumeric characters.

Any other embodiment of the challenge can be used. The type of challenge and the version number may not be contained in the challenge, but communicated by the user via the communication means 9. It is also possible to insert other elements known by the user 7 and/or by the local machine 4 into the challenge.

The server 3 calculates the Station Secret SS from the Master Station Secret MSS stored in the administrative storage means 16 and communicates it to the local machine 4 in question during a first connection in the normal mode. The Station Secret shared between the local machine 4 and the remote server 3 makes it necessary to go through the remote server 3 in order to unlock any local machine 4. No machine 2 other than the remote server 3 can unlock a local machine 4.

The server 3 maintains in the administrative storage means 16 each version of the Master Station Secret if it is not possible to update all of the machines 4 simultaneously.

The challenge D has a form adapted to its transmission by the user 7 to the administrator 8 through the communication means 9. The challenge is advantageously short and intelligible in order to be transmitted more easily, and in order to reduce the risk of errors. The challenge generated is indicated to the user in the box designated by the word "Challenge" in the dialog box displayed on the screen of the local machine 4, as illustrated in FIG. 2.

Figure 3:
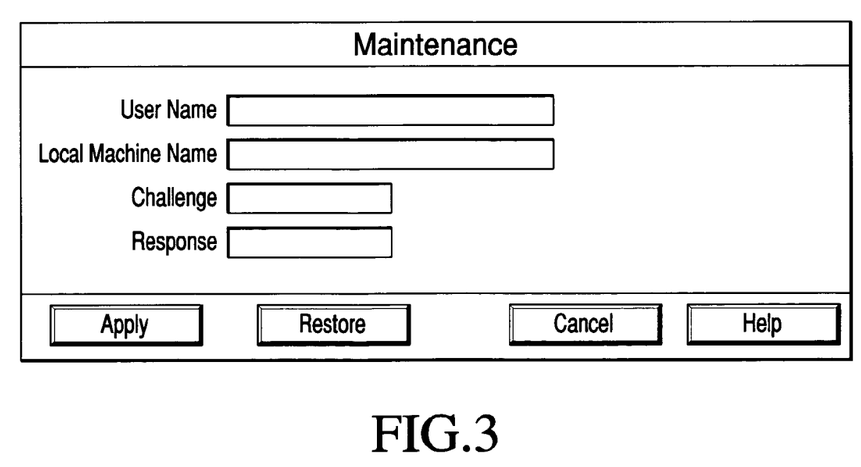
FIG. 3 represents the screen of a server of the computer system according to an embodiment of the present invention.

The process according to the invention then consists of communicating to the administrator 8 the challenge D created, as well as elements known by the user 7, via the communication means 9. The user 7 contacts the administrator via the communication means 9, communicating to him the challenge D generated by said machine as well as elements known by him, such as his user name and the name of the local machine 4 in question. The administrator 8 chooses the maintenance mode in the server 3. The dialog box illustrated in FIG. 3 is displayed on the screen of the server 3. The administrator 8 enters into the server 3 the name of the user 7, the name of the local machine 4 and the challenge D communicated by the user and clicks on the "Apply" box (FIG. 3).

The process according to the invention then consists of performing a predetermined calculation by means of the remote server 3 in order to obtain a response RD that is a function of the challenge D and/or of predetermined data.

The administrative authentication module 13 analyzes the first byte of the challenge entered in order to determine its type, standard or limited. In the case of a standard challenge, the administrative authentication module 13 notes the version number of the Master Station Secret given by the second byte of the challenge. In the case of a limited challenge, the second byte is not taken into consideration. The administrative response calculating module 15 calculates a response RD to the challenge D that is adapted to the given type of challenge; the response RD is capable of being transmitted by the communication means 9. The response RD to the challenge, just like the challenge D, is small in size and is intelligible. The response RD depends on the challenge and on predetermined data such as the user name, information stored in the central database 6, i.e., the password associated with the user name communicated by the user, and in the case of a standard challenge, the secret shared between the server 3 and the local machine 4 (SS), a secret that itself depends on the name of the local machine 4 in question;

in the case of a limited challenge, the name of the local machine 4 in question and the fixed security key CC shared between the server 3 and the local machine 4.

The administrative response calculating module 15 calculates the response RD to the challenge in the following way:

For a standard type challenge:

The administrative module for calculating a response to a challenge 15 calculates the Station Secret, taking into account the version number of the Master Station Secret given by the challenge. The corresponding version of the Master Station Secret is searched for in the administrative storage means 16. The secret modification module 14 applies the modification key C to the Master Station Secret in order to obtain the Station Secret: the Master Station Secret and the local name of the machine 4 transmitted by the user are concatenated. The character string thus obtained is hashed in accordance with the hash algorithm of the secret modification module 14.

The password associated with the user name entered is searched for in the database 6 and hashed by means of a one-way algorithm such as the algorithms MD5 or SHA in order to obtain a coded password.

The response to a standard type challenge is obtained by hashing a character string corresponding to the concatenation in a predetermined order of the user name and the challenge, both transmitted by the user, the coded password and the Station Secret calculated as described above.

According to one embodiment, the equation for obtaining the response to a challenge of the standard type is the following:

$$RD=[\text{Station Secret}+\text{user name}+\text{coded password}+\text{Challenge}+\text{Station Secret}]_{hashconcatenation}$$

For a limited type challenge:

The password associated with the user name entered is searched for in the database 6 and hashed by means of a one-way algorithm such as the algorithms MD5 or SHA in order to obtain a coded password.

The response to a limited type challenge is obtained by hashing a character string corresponding to the concatenation in a predetermined order of the user name transmitted by the user, the coded password, the challenge transmitted by the user, the local name of the machine 4 transmitted by the user and a fixed security key CC contained in the storage means 16 of the server 3.

The equation for obtaining a response to a limited type challenge is for example the following:

$$RD=[\text{user name}+\text{coded password}+\text{Challenge}+\text{name of the machine 4}+\text{fixed key CC}]_{hashconcatenation}$$

The fixed security key CC can take any form and can for example be integrated into the hardware. For example, it exists in the form of a byte string integrated into the machines 2.

The hashing of the concatenation is performed for example by means of a one-way algorithm such as the algorithms MD5 or SHA.

Any other form of response can be used. The response RD can be calculated from only certain elements among those described above, or from specific combinations of all or some of these elements.

The response RD calculated is displayed on the screen of the server 3 in the box designated by the word "Response" (FIG. 3).

The process then consists of transmitting to the user 7 the response RD obtained through the communication means 9; the administrator 8 transmits the response RD to the challenge to the user 7 through the communication means 9.

The process then consists of performing a calculation by means of the local machine 4 in the same way as the remote server 3 in order to obtain a response RD 1 that is a function of the challenge D and/or of predetermined data.

The user 7 enters the response RD to the challenge into the local machine 4 in question in the box of the dialog box designated by the word "Response", as shown in FIG. 2, and clicks on the OK box. The user module for calculating a response to a challenge 12 calculates the response RD 1 to the challenge D generated by the user challenge generating module 11 in the same way as the administrative module for calculating a response to a challenge 15. The expression "in the same way as" means that the calculations performed respectively by the administrative module for calculating a response to a challenge 15 and by the user module for calculating a response to a challenge 12 are based on the same principles so that the responses obtained by the respective calculations can be compared and so that the result of this comparison shows that the information used respectively by the remote server 3 and by the local machine 4 to calculate responses is identical.

The information required for the calculation of said response is available:
- the user name, the password and the challenge are stored in the user storage means 17;
- the name of the local machine 4 is known by said local machine 4;
- the Station Secret SS or the fixed security key CC are stored in the user storage means 17.

Once the response has been calculated, the user name, the password and the challenge are deleted from the user storage means 17.

The process then consists of comparing the response RD transmitted by the administrator to the response RD 1 calculated by the local machine 4 and of authorizing the user's connection to the machine 4 locally based on the result of the comparison.

The user authentication module 10 compares said response RD 1 to the response RD obtained by the server 3 and transmitted by the administrator. Several types of comparison can be used, depending on the calculation performed in the server 3 and the local machine 4. According to one exemplary embodiment, the user module for calculating a response to a challenge 12 and the administrative module for calculating a response to a challenge 15 use an identical calculation algorithm: the comparison type is therefore that of the identity of the responses obtained by the server 3 and the local machine 4, respectively. If the response RD 1 obtained by the user response calculating module 12 is identical to the response RD transmitted by the administrator through the communication means 9, the user is authenticated and is authorized to connect locally to the machine 4 in question.

According to one embodiment of the invention, the remote authentication process according to the invention comprises an additional local authentication. When the user has connected locally in accordance with the process according to the invention as described above, he may wish to disconnect temporarily. In that case, he is provided with an additional local authentication in order to avoid having to repeat the entire process according to the invention.

Figure 4:
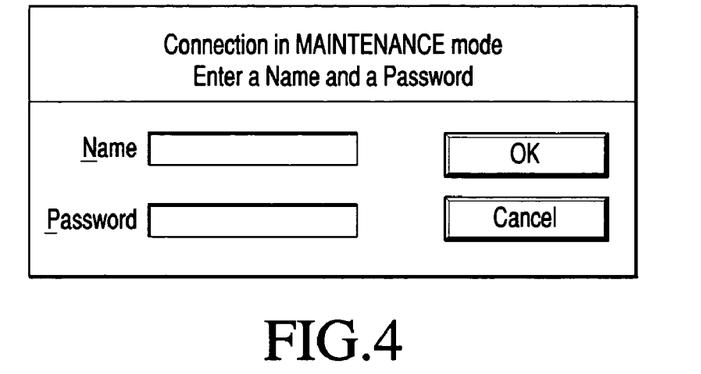

As shown in FIG. 4, the user authentication module 10 prompts the user 7 to enter into the machine 4 a user name and a password for the maintenance mode.

The maintenance mode user name and the maintenance mode password are stored in the user storage means 17.

The user authentication module 10 checks to see if the maintenance mode user name 7 already exists in the storage means 17. The storage means 17 can exist in the form of a data base. If the maintenance mode user name exists, the maintenance mode password associated with the maintenance mode user name entered by the user is stored in the storage means 17; it replaces any existing password associated with the maintenance mode user name in question. If the maintenance mode user name does not exist, it is created.

Figure 5:
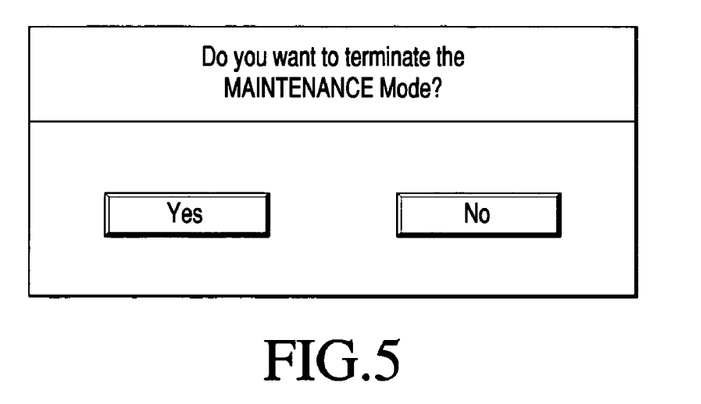
Figure 6:
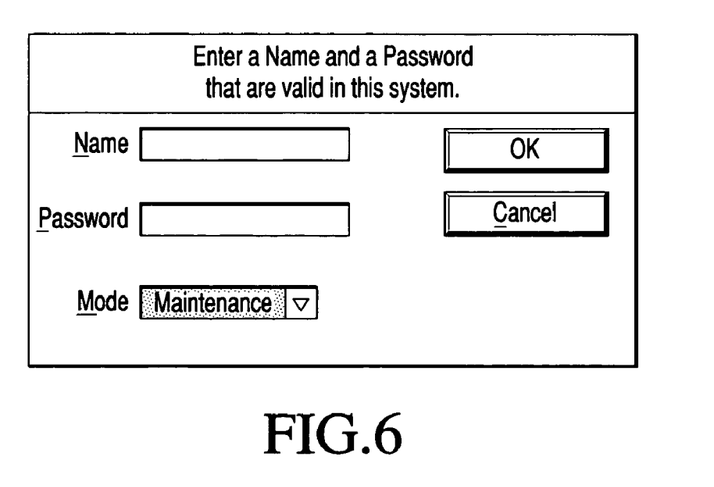

At the end of the session, the user, when disconnecting, can exit from or remain in the maintenance mode, as shown in FIG. 5. If he exits from the maintenance mode, he must repeat the remote authentication process in its entirety. If he remains in the maintenance mode, he will only need to enter his maintenance mode user name and associated maintenance mode password, as shown in FIG. 6. The user authentication module 10 checks to see whether the maintenance mode user name and password are stored in the storage means 17, and whether they correspond to those stored. If so, the local connection is again authorized without having to repeat the remote authentication process according to the invention.

The maintenance mode can provide for a limited duration during which the user can connect and disconnect. If the user disconnects after having exceeded the authorized duration, he must again be authenticated according to the invention.

The capability to use the remote authentication process according to the invention, and hence the maintenance mode and the duration of the maintenance mode, can be configured in the local machines 4. It must be noted that the authorization to connect locally is given by an administrator for a given station.

The process for the remote authentication of the user 7 for local access to the local machine 4 belonging to a network 5 that includes the remote server 3 managed by the administrator 8 and containing the means 6 for classifying information, is characterized in that it consists of:
- creating by means of the local machine 4 a challenge D capable of being transmitted by the communication means 9, the communication means connecting the user with the administrator 8;
- communicating to the administrator 8 the challenge D created, as well as elements known by the user, via the communication means 9;
- performing a predetermined calculation by means of the server 3 in order to obtain a response RD that is a function of the challenge D and/or of predetermined data;
- comparing the response RD transmitted by the administrator to the response RD1 calculated by the local machine 4 based on the result of the comparison.

The calculation performed by the server 3 consists of modifying, in accordance with a given algorithm, the challenge D and/or at least one of the following pieces of data; at least one piece of information issued by the classification means and known by the user, at least one secret shared between the server 3 and the local machine 4, at least one element communicated by the user.

The calculation performed by the local machine 4 consists of modifying, in accordance with a given algorithm, the challenge D and/or at least one of the following pieces of data: at least one secret shared between the server 3 and the local machine 4, at least one element communicated by the user.

The shared secret or secrets are entered into the server 3 and transmitted to the local machine 4 during a successful network authentication.

The shared secret or secrets are modified by means of a modification key C that depends on the local machine 4 prior to being modified by the algorithm.

The modification key consists of concatenating the secret or a combination of secrets existing in the form of a byte string called the Master Station Secret, and of hashing the byte string obtained by concatenation, by means of a calculation algorithm, in order to obtain a byte string called a Station Secret.

The shared secret or secrets are accompanied by a version number that is incremented each time they are modified.

The challenge is constituted by an alphanumeric character string.

The challenge is composed of:
- a first byte representing the type of challenge, the type indicating whether a network authentication has been performed;
- second and third bytes representing the version number of the shared information;
- random alphanumeric characters of the fourth to twelfth bytes.

The response (RD; RD 1) is calculated by hashing, in accordance with a calculation algorithm, a character string composed of the concatenation in a predetermined order of the challenge, the character string resulting from the transformation by a calculation algorithm of the user's password, the Station Secret and the user's name.

The response (RD; RD1) can also be calculated by hashing, in accordance with a calculation algorithm, a character string composed of the concatenation in a predetermined order of the challenge, a fixed security key CC stored in the local machine 4 and in the server 3, the name of the local machine 4, the character string resulting from the transformation by a calculation algorithm of the user's password and user name.

The local connection authorized is temporary, the authorized duration being configurable.

The process consists of locally authenticating the user 7 after a disconnection by the user 7 authenticated remotely.

The present invention also relates to the system for the remote authentication of the user 7 for local access to the so-called local machine 4 belonging to a network 5 that includes a remote server 3 managed by the administrator 8 and containing means 6 for classifying information, characterized in that it comprises communication means 9 connecting the user 7 with the administrator 8, in that each local machine 4 comprises a user authentication module 10 that includes a user module for generating a challenge 11 and a user module for calculating a response to a challenge 12, and in that the server 3 comprises an administrative authentication module 13 comprising an administrative module for calculating a response to a challenge 14.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A process for the remote authentication of a user for local access to a local machine of a network having a remote server managed by an administrator, classification means for classifying information, and communication means for connecting the user and the administrator comprising:
   - creating a challenge (D) capable of being transmitted by the communication means, the challenge including a first portion including at least one byte representing the type of challenge, and a second portion including at least one byte representing version information and alphanumeric characters, the type of challenge representing whether a network authentication has been performed;
   - communicating the challenge (D) to the administrator together with elements known by the user, via the communication means;
   - performing a first predetermined calculation by means of the server and obtaining a first response (RD) that is a function of at least one of the challenge (D) and of predetermined data;
   - transmitting to the user by the administrator the first response (RD);

performing a second calculation by means of the local machine and obtaining a second response (RD1) that is a function of at least one of the challenge (D) and of the predetermined data; and comparing the first response (RD) transmitted by the administrator to the second response (RD1) obtained by the local machine so as to authenticate the user and locally authorize connection of the user to the local machine based on the result of the comparison.

2. A process according to claim 1, wherein the first predetermined calculation performed by the server comprises modifying, in accordance with a given algorithm, the challenge (D) and at least one of the following pieces of data:
   a.) at least one piece of information issued by the classification means and known by the user,
   b.) at least one secret shared between the server and the local machine, and
   c.) at least one element communicated by the user.

3. A process according to claim 2, wherein the second calculation performed by the local machine comprises modifying, in accordance with a given algorithm, the challenge (D) and at least one of the following pieces of data:
   a.) at least one secret shared between the server and the local machine, and
   b.) at least one element communicated by the user.

4. A process according to claim 3, wherein said at least one shared secret is entered into the server and transmitted to the local machine during a successful network authentication.

5. A process according to claim 3, wherein said at least one shared secret or secrets are accompanied by a version number that is incremented each time the secret is modified.

6. A process according to claim 2, wherein said at least one shared secret is entered into the server and transmitted to the local machine during a successful network authentication.

7. A process according to claim 2, wherein said at least one shared secret or secrets are modified by means of a modification key (C) that depends on the local machine, prior to being modified by the algorithm.

8. A process according to claim 7, wherein the modification key (C) comprises concatenating the secret or a combination of secrets existing in the form of a byte string called a Master Station Secret and of hashing the byte string obtained through concatenation by means of a calculation algorithm, to obtain a byte string called a Station Secret.

9. A process according to claim 8, wherein the response (RD; RD1) is calculated by hashing, in accordance with a calculation algorithm, a character string comprising the concatenation in a predetermined order of the challenge, the character string resulting from the transformation by a calculation algorithm of the user's password, the Station Secret and the user's name.

10. A process according to claim 2, wherein said at least one shared secret or secrets are accompanied by a version number that is incremented each time the secret is modified.

11. A process according to claim 2, wherein the challenge is constituted by a byte string.

12. A process according to claim 1, wherein the second calculation performed by the local machine comprises modifying, in accordance with a given algorithm, the challenge (D) and at least one of the following pieces of data:
   a.) at least one secret shared between the server and the local machine, and
   b.) at least one element communicated by the user.

13. A process according to claim 12, wherein said at least one shared secret is entered into the server and transmitted to the local machine during a successful network authentication.

14. A process according to claim 12, wherein said at least one shared secret or secrets are accompanied by a version number that is incremented each time the secret is modified.

15. A process according to claim 1, wherein the challenge is constituted by a byte string.

16. A process according to claim 1, wherein the response (RD; RD1) is calculated by hashing, in accordance with a calculation algorithm, a character string comprising the concatenation in a predetermined order of the challenge, a fixed security key CC stored in the local machine and in the server, the name of the local machine, and the character string resulting from the transformation by a calculation algorithm of the user's password and user name.

17. A process according to claim 1, wherein the local connection authorized is temporary, the authorized duration of the local connection being configurable.

18. A process according to claim 1, further comprising locally authenticating the user after the user authenticated remotely is disconnected from the local machine.

19. A process for the remote authentication of a user for local access to a local machine of a network having a remote server managed by an administrator, classification means for classifying information, and means for connecting the user and the administrator comprising:

creating a challenge (D) capable of being transmitted by the communication means;

communicating the challenge (D) to the administrator together with elements known by the user, via the communication means;

performing a first predetermined calculation by means of the server and obtaining a first response (RD) that is a function of at least one of the challenge (D) and of predetermined data;

transmitting to the user by the administrator the first response (RD);

performing a second calculation by means of the local machine and obtaining a second response (RD1) that is a function of at least one of the challenge (D) and of the predetermined data; and comparing the first response (RD) transmitted by the administrator to the second response (RD1) obtained by the local machine so as to authenticate the user and locally authorize connection of the user to the local machine based on the result of the comparison, wherein the first predetermined calculation performed by the server comprises modifying, in accordance with a given algorithm, the challenge (D) and at least one of the following pieces of data:

at least one piece of information issued by the classification means and known by the user, at least one secret shared between the server and the local machine, and at least one element communicated by the user, and said at least one shared secret or secrets are accompanied by a version number that is incremented each time the secret is modified; and the challenge comprises:

a first byte representing the type of challenge, the type of challenge indicating whether a network authentication has been performed;

second and third bytes representing the version number of the shared information; and random alphanumeric characters of the fourth to twelfth bytes.

20. A process for the remote authentication of a user for local access to a local machine of a network having a remote server managed by an administrator, classification means for classifying information, and means for connecting the user and the administrator comprising:

creating a challenge (D) capable of being transmitted by the communication means;

communicating the challenge (D) to the administrator together with elements known by the user, via the communication means;

performing a first predetermined calculation by means of the server and obtaining a first response (RD) that is a function of at least one of the challenge (D) and of predetermined data;

transmitting to the user the first response (RD);

performing a second calculation by means of the local machine and obtaining a second response (RD1) that is a function of at least one of the challenge (D) and of the predetermined data; and comparing the first response (RD) transmitted by the administrator to the second response (RD1) calculated by the local machine so as to authenticate the user and locally authorize connection of the user to the local machine based on the result of the comparison, wherein, the challenge comprises:

a byte string, comprising:

a first byte representing the type of challenge, the type of challenge indicating whether a network authentication has been performed;

second and third bytes representing the version number of the shared information; and random alphanumeric characters of the fourth to twelfth bytes.

21. A computing system for the remote authentication of a user for local access to a local machine of a network having a remote server managed by an administrator, classification means for classifying information, and communication means for connecting the user and the administrator comprising:

means for creating a challenge (D) capable of being transmitted by the communication means, the challenge including a first portion including at least one byte representing the type of challenge, and a second portion including at least one byte representing version information and alphanumeric characters, the type of challenge representing whether a network authentication has been performed;

means for communicating the challenge (D) to the administrator together with elements known by the user, via the communication means;

means for performing a first predetermined calculation by means of the server and obtaining a first response (RD) that is a function of at least one of the challenge (D) and of predetermined data;

means for transmitting to the user by the administrator the first response (RD);

means for performing a second calculation by means of the local machine and obtaining a second response (RD1) that is a function of at least one of the challenge (D) and of the predetermined data; and means for comparing the first response (RD) transmitted by the administrator to the second response (RD1) obtained by the local machine so as to authenticate the user and locally authorize connection of the user to the local machine based on the result of the comparison.

* * * * *